(12) United States Patent
Haitani et al.

(10) Patent No.: US 7,487,470 B2
(45) Date of Patent: Feb. 3, 2009

(54) METHOD AND APPARATUS FOR INTERACTING WITH A PORTABLE COMPUTER SYSTEM

(75) Inventors: Robert Yuji Haitani, San Jose, CA (US); Jeffrey C. Hawkins, Redwood City, CA (US)

(73) Assignee: ACCESS Systems Americas, Inc., Sunnyvale, CA (US)

( * ) Notice: Subject to any disclaimer, the term of this patent is extended or adjusted under 35 U.S.C. 154(b) by 479 days.

(21) Appl. No.: 11/224,769

(22) Filed: Sep. 12, 2005

(65) Prior Publication Data
US 2006/0010405 A1  Jan. 12, 2006

Related U.S. Application Data

(63) Continuation of application No. 10/143,999, filed on May 10, 2002, now Pat. No. 6,996,784, which is a continuation of application No. 09/272,979, filed on Mar. 19, 1999, now Pat. No. 6,448,988, which is a continuation of application No. 08/790,518, filed on Jan. 29, 1997, now Pat. No. 5,900,875.

(51) Int. Cl.
*G06F 3/00* (2006.01)
*G06F 1/26* (2006.01)

(52) U.S. Cl. .................. 715/864; 715/840; 713/320

(58) Field of Classification Search ............. 715/840, 715/802, 803, 810, 835, 864; 345/169, 184
See application file for complete search history.

(56) References Cited

U.S. PATENT DOCUMENTS

| | | |
|---|---|---|
| 3,744,034 A | 7/1973 | Paul |
| 5,218,704 A | 6/1993 | Watts, Jr. et al. |
| 5,235,679 A | 8/1993 | Yoshizawa et al. |
| 5,475,847 A | 12/1995 | Ikeda |
| 5,488,685 A | 1/1996 | Palmer et al. |
| 5,557,288 A | 9/1996 | Kato et al. |
| 5,587,724 A | 12/1996 | Matsuda |
| 5,602,997 A | 2/1997 | Carpenter et al. |
| 5,630,148 A | 5/1997 | Norris |
| 5,650,001 A | 7/1997 | Howell |
| 5,661,632 A | 8/1997 | Register |

(Continued)

FOREIGN PATENT DOCUMENTS

EP    0 917 077 A2    5/1999

OTHER PUBLICATIONS

Ruley, J., et al, "Handheld-to handheld Combat," Windows Magazine, 1997, n811, p. 55.

(Continued)

*Primary Examiner*—Sy D Luu
(74) *Attorney, Agent, or Firm*—Hickman Palermo Truong & Becker LLP

(57) ABSTRACT

A palmtop computer system that incorporates mechanical buttons that combine the task of turning the palmtop computer system on and starting a particular application program. Furthermore, the same mechanical button can be used to navigate the application program to find the information that is most likely needed by the user. Additionally, external devices can be coupled to the palmtop computer system in a manner that allows the external hardware device to initiate specific application programs that cooperate with the external hardware device.

12 Claims, 5 Drawing Sheets

U.S. PATENT DOCUMENTS

| | | | |
|---|---|---|---|
| 5,666,530 | A | 9/1997 | Clark et al. |
| 5,673,322 | A | 9/1997 | Pepe et al. |
| 5,703,581 | A | 12/1997 | Matias et al. |
| 5,704,029 | A | 12/1997 | Wright, Jr. |
| 5,745,056 | A | 4/1998 | Takahashi et al. |
| 5,796,404 | A | 8/1998 | Gentner |
| 5,802,312 | A | 9/1998 | Lazaridis et al. |
| 5,815,820 | A | 9/1998 | Kiem et al. |
| 5,825,353 | A | 10/1998 | Will |
| 5,854,624 | A | 12/1998 | Grant |
| 5,873,108 | A | 2/1999 | Goyal et al. |
| 5,884,323 | A | 3/1999 | Hawkins et al. |
| 5,900,875 | A | 5/1999 | Haitani et al. |
| 5,907,801 | A | 5/1999 | Albert et al. |
| 5,911,141 | A | 6/1999 | Kelley et al. |
| 5,918,013 | A | 6/1999 | Mighdoll et al. |
| 5,949,408 | A | 9/1999 | Kang et al. |
| 5,966,125 | A | 10/1999 | Johnson |
| 5,973,645 | A | 10/1999 | Zigler et al. |
| 6,006,274 | A | 12/1999 | Hawkins et al. |
| 6,034,621 | A | 3/2000 | Kaufman |
| 6,049,328 | A | 4/2000 | Vanderheiden |
| 6,115,384 | A | 9/2000 | Parzych |
| 6,205,448 | B1 | 3/2001 | Kruglikov et al. |
| 6,231,371 | B1 | 5/2001 | Helot |
| 6,300,946 | B1 | 10/2001 | Lincke et al. |
| 6,309,230 | B2 | 10/2001 | Helot |
| 6,330,618 | B1 | 12/2001 | Hawkins et al. |
| 6,771,250 | B1 | 8/2004 | Oh |

OTHER PUBLICATIONS

Forbes, J. et al, "Palm PCs get a Big Hand," Windows Magazine, 1998, n905, p. 96.

Bursky, D., "Evolving DSP chips do more," Electronic Design, v38, n23, p. 51(8), Dec. 1990.

Feigel, C. P., "IBM, Motorola Preview embedded PoserPCs; . . . ," Microprocessor Report, v8, May 1994, n6, p. 1(5).

Mastering Microsoft Office 97 Professional Edition (Sybex, Inc.; 1996, pp. 754-807).

Eric A. Bier, "EmbeddedButtons: Documents as User Interfaces," pp. 45-53, UIST'91, Proceedings of the ACM Symposium on User Interface Software and Technology, Hilton Head, Nov. 11-13, 1991.

Allan MacLean, et al., "User-Tailorable Systems: Pressing the Issues with Buttons," Apr. 1990, pp. 175-182, Rank Xerox EuroPARC, CHI '90 Conference Proceedings.

Jim Louderback, "Zoomer doesn't zoom, but for some user this PDS makes sense," Oct. 25, 1993, PC Week v10, n42, 1 page.

Isamu Iwai, et al., "User Interface Development Tools for Pen Computer Applications," pp. 1016-1021, Proceedings of the Fifth International Conference on Human-Computer Interaction, Orlando, Florida, Aug. 8-13, 1993, vol. 2.

George W. Fitzmaurice, et al., "Virtual Reality for Palmtop Computers," pp. 197-218, ACM Transactions on Information Systems, vol. 11, No. 3, Jul. 1993.

"Special Edition Using Netscape 3, Complete Reference," pp. 1-39, 1996.

"Windows 95" 1996, pp. 1115-1158.

Gray (Efficient MC68HC08 programming: reducing cycle count and improving code density; Dr. Dobb's Journal, v20, n5, p. 70 (5); pp. 4; May 1995).

Penwarden (More Muscle for HP's Omnibook; Windows Magazine, n501, 110; pp 2; 1994).

Moseley et al. (Mastering Microsoft Office 97 Professional Edition, Second Edition, 1996; pp. 757, 784, and 790).

METHOD AND APPARATUS FOR INTERACTING WITH A PORTABLE COMPUTER SYSTEM

This present application is a continuation of U.S. patent application Ser. No. 10/143,999, entitled "Method and Apparatus for Interacting with a Portable Computer System", filed on May 10, 2002, by Robert Haitani, et al., now U.S. Pat. No. 6,996,784; which is a continuation U.S. patent application Ser. No. 09/272,979, entitled "Method and Apparatus for Interacting with a Portable Computer System", filed on Mar. 19, 1999, by Robert Haitani, et al., now U.S. Pat. No. 6,448, 988 B1; which is a continuation of U.S. patent application Ser. No. 08/790,518, entitled "Method and Apparatus for Interacting with a Portable Computer System", filed on Jan. 29, 1997, by Robert Haitani, et. al, now U.S. Pat. No. 5,900, 875. This present application claims priority benefit of all the previously filed patent applications identified in this paragraph. The present application incorporates herein by reference all the previously filed patent applications identified in this paragraph.

FIELD OF THE INVENTION

The present invention relates to the field of portable computer systems. Specifically, the present invention discloses a portable computer system that can quickly be turned on and access relevant information with a minimal user interaction.

BACKGROUND OF THE INVENTION

Many busy business professionals require a lot of information while they are traveling. To fill this need, a market for palmtop computer systems has emerged. Palmtop computer systems are small compact computers that can fit in the palm of your hand. Palmtop computer systems are usually used to perform personal informational management tasks such as, an address book, a daily organizer and a to do list.

Users of palmtop computer systems need to be able to access the information stored into the palmtop computer as fast as possible. For example, a person talking on a phone may schedule an appointment with the person on the other end of the phone. Thus, the person would need to access the information in his calendar program on the palmtop computer system as fast as possible such that no interruption of the telephone conversation would be required.

Existing palmtop computer systems often require a number of steps to obtain the desired information. For example, to obtain information from a calendar date, a person may first need to turn on the palmtop computer system. Some systems then require a "boot-up" time before the palmtop computer system enters an operational state. After the palmtop is on and ready, the person must then start the calendar application. Finally, the person must navigate the calendar application to locate the desired date. Although, those few steps may seem simple, such steps seem to be an unnecessary nuisance to a person that wants to quickly access the appropriate information. It would therefore be desirable to implement a palmtop computer system that allows the user to very quickly access the required information.

SUMMARY AND OBJECTS OF THE INVENTION

It is therefore an object of the present invention to implement a palmtop computer system that allows a user to quickly turn on the palmtop computer system and access the needed information. It is a further object of the present invention to allow the user to executed specific programs on the palmtop computer system using external devices coupled to the palmtop computer system.

These and other objectives are accomplished by the palmtop computer system of the present invention which incorporates mechanical buttons that combine the task of turning the palmtop computer system on and starting a particular application program. Furthermore, the same mechanical button can be used to navigate the application program to find the information that is most likely needed by the user. Additionally, external devices can be coupled to the palmtop computer system in a manner that allows the external hardware device to initiate specific application programs that cooperate with the external hardware device.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for implementing a palmtop computer system that is well integrated with a personal computer system is disclosed. In the following description, for purposes of explanation, specific nomenclature is set forth to provide a thorough understanding of the present invention. However, it will be apparent to one skilled in the art that these specific details are not required to practice the present invention. In other instances, well-known circuits and devices are shown in block diagram form to avoid obscuring the present invention.

A Portable Computer System With One-Touch Application Buttons

Figure 1:
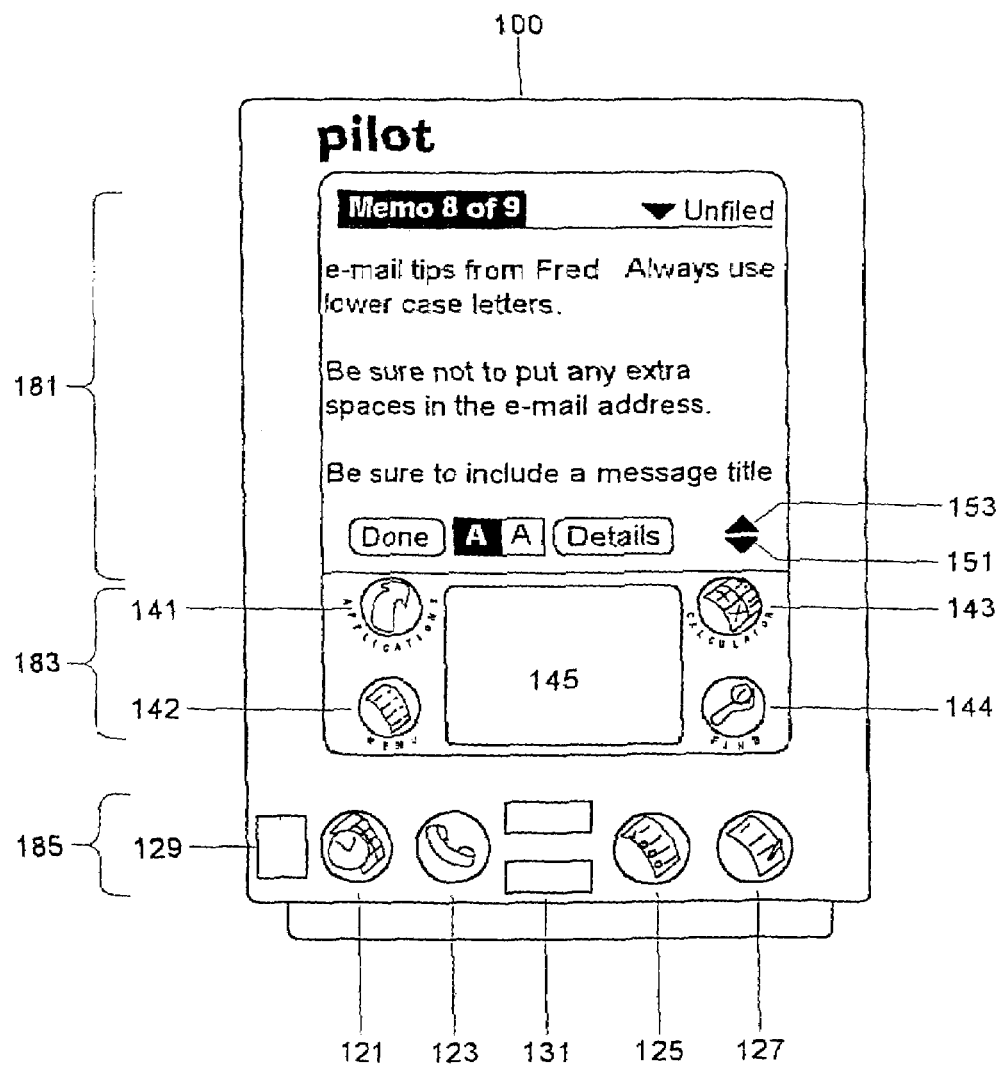
FIG. 1 illustrates a portable computer system with defined application buttons.

FIG. 1 illustrates a one embodiment of a portable computer system 100 constructed according to the teachings of the present invention. Most of the surface area of the portable computer system 100 consists of a screen display area 181. The screen display area 181 is used for displaying information to the user. The screen display area is covered with a touch sensitive digitizer pad that can detect user interaction with a stylus or finger.

Below the display area 181 is a user input area 183. The user input area 183 is used to input text in the Graffiti® writing area 145 and interact with the application buttons 141 through 144. The user input area 183 is covered by the digitizer pad that will sense the users finger or stylus.

Below the user input area 183 is a mechanical button input area 185. In the embodiment of FIG. 1 there are seven different mechanical buttons on the front of the portable computer system: a power button, two directional scrolling buttons, and four different application buttons.

The first mechanical button is a power button 129. If the portable computer system 100 is off, then the power button 129 turns on the portable computer system 100 and brings the portable computer system 100 to the state that the portable computer system 100 was in just before it powered down. Conversely, if the portable computer system is on then pressing the power button 129 will save the current state of the portable computer system 100 and turn the portable computer system 100 off.

A pair of scrolling buttons 131 are used to scroll information in the display area 181 up and down. The scrolling buttons 141 allow a user to view a list of information that does not fit on the display.

There are four mechanical application buttons 121, 123, 125, and 127 illustrated in FIG. 1. In the embodiment of FIG. 1, application button 121 is used for a calendar application, application button 123 is used for an address book application, application button 125 is used for a To-do list application, and application button 127 is used for a note pad application. The embodiment of FIG. 1 provides just one possible set of applications. Other applications could be used instead of the applications illustrated in FIG. 1. Furthermore, the application buttons are programmable such that applications assigned to each application button may be changed.

When the portable computer system 100 is powered-off, the application function buttons 121, 123, 125 and 127 turn on the portable computer system and then begin executing the associated application. For example, if the user presses the addressbook application button 123, the portable computer system will turn on and begin executing the address book application.

In the present embodiment, the application buttons operate by generating a hardware interrupt signal to the processor in the portable computer system 100. The hardware interrupt signal wakes the processor in the portable computer system 100 from a sleep mode and caused the processor to execute code in a wake-up routine. In the wake-up routine, the processor checks a register to determine which application button was pressed. After determining which application button was pressed.

To further convenience the user, each application starts executing by entering a state that has been chosen to best provide the information the user may be seeking. The following table lists the current applications illustrated in FIG. 1 and the initial state that each application enters when the corresponding application button is pressed:

| Application | Description of Initial state. |
|---|---|
| Calendar | Appointment list for the current day. |
| Addressbook | List of names and phone numbers for most recently accessed multi-function category. |
| To-Do | To-Do list of most recently accessed multi-function category. |
| Memo Pad | Current Memo being edited (if any) else current list of memos. |

Thus, each application button turns on the portable computer system 100, starts executing the corresponding application, and brings the corresponding application into an initial state that has been chose to provide the most useful information. In some applications, the initial state can be set by the user such that the user can decide what state the application should enter when the corresponding application button has been pressed.

Multi-function Categories and Application Button Overloading

Figure 2A:
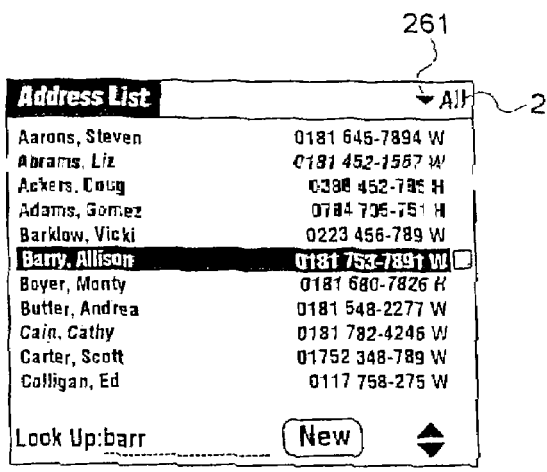
FIG. 2a illustrates a screen display for an addressbook application program that divides records using multi-function categories.

As stated in the previous section, when the addressbook application button 123 is pressed, the portable computer system is turned on and the addressbook application starts executing. FIG. 2A provides an example of how the addressbook application may appear on the screen after the addressbook application button 123 has been pressed. In FIG. 2A there is a list of acquaintances of the user and associated telephone numbers. The user can select a particular acquaintance using a stylus or his finger. In FIG. 2A the acquaintance "Allison Barry" has been selected. If the user touches the selected Allison Barry again, a display screen containing additional information about Allison Barry will be presented.

Referring to the upper right corner of the addressbook screen display in FIG. 2A, there is a multifunction category name 263. In FIG. 2A, the multifunction category that is currently displayed is the "all" category. Each addressbook record is assigned to a particular multifunction category. By assigning each addressbook record to a multifunction category, certain acquaintances can be grouped together. For example, one multifunction category may be "personal" and that category would include close personal friends of the user. Another multifunction category may be "business" and that category would include business acquaintances of the user. The "all" displays all the addressbook records from all multifunction categories.

Figure 2B:
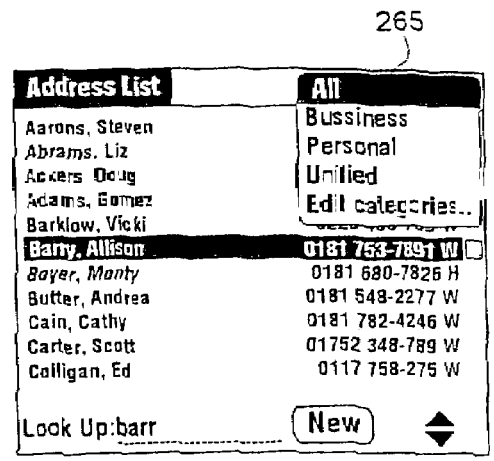
FIG. 2b illustrates a screen display for an addressbook application program that is displaying a pop-up menu with the multi-function categories.

Next to the multifunction category name 263 is a multifunction category edit indicator 261. The multifunction category edit indicator 261 indicates that the user can select a particular multifunction category to display by selecting the multifunction category edit indicator 261. For example, FIG. 2B illustrates how the screen would appear after the user selects the multifunction category edit indicator 261. In FIG. 2B a list of the available multifunction categories is displayed. In the example of FIG. 2B, the available multifunction categories are "all" categories, "business" acquaintances, "personal" acquaintances and "unfiled" acquaintances. Furthermore, the user can add additional multifunction categories or edit the existing multifunction categories by selecting the "Edit categories . . . " list item from the pop-up menu.

Figure 2C:
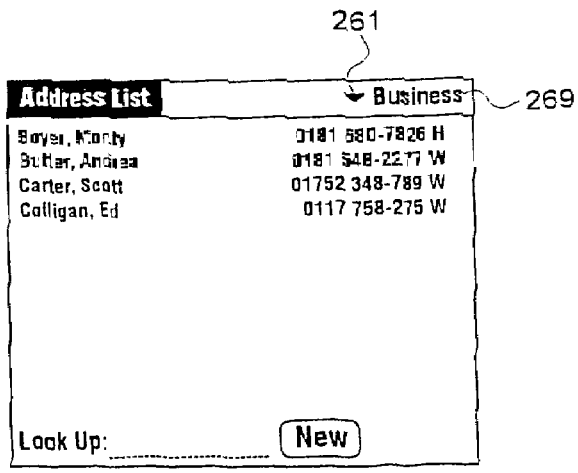
FIG. 2c illustrates a screen display for an addressbook application program that is displaying a set of records under the "business" multi-function category.

An easier method of switching between the different multifunction categories exists. Specifically, the user can select between the various multifunction categories in the addressbook by continuing to press the addressbook application button after the addressbook application is executing. For example, referring to the addressbook display of FIG. 2A if the user again presses the addressbook application button 123, the address book application will move on to the multifunction category, the business category, as illustrated in FIG. 2C. By successively pressing the address book application button 123 the user can scroll through all the different multifunction categories. Alternatively, the user may continuously hold down the addressbook application button 123 and the addressbook application will slowly scroll through the different multifunction categories.

Different applications can perform different actions when their respective application button is pressed when the application is already running. Thus, each application button is "overloaded" in that the function that the key performs depends on the current context. The following table describes how each application behaves when the associated application button is pressed when the application is already running:

| Application | Effect of pressing the Application button when the application is already running. |
|---|---|
| Calendar | Scroll through appointment list for the current day. (Scroll keys move to different days.) |
| Addressbook | Rotate through the different multifunction categories. |
| To-Do | Rotate through the different multifunction categories. |
| Memo Pad | Rotate through the different multifunction categories. |

In summary, each application button turns on the portable computer system 100 and begins executing the associated application if the portable computer system is off. If a different application is running when an application button is pressed, the application associated with the pressed application button begins executing. However, if the application is already up and running and the application button for that application is pressed then the application can perform a specific function such as rotating through different multifunction categories as described in the example of FIGS. 2A and 2C.

Externally Accessible Application Signals

Figure 3:
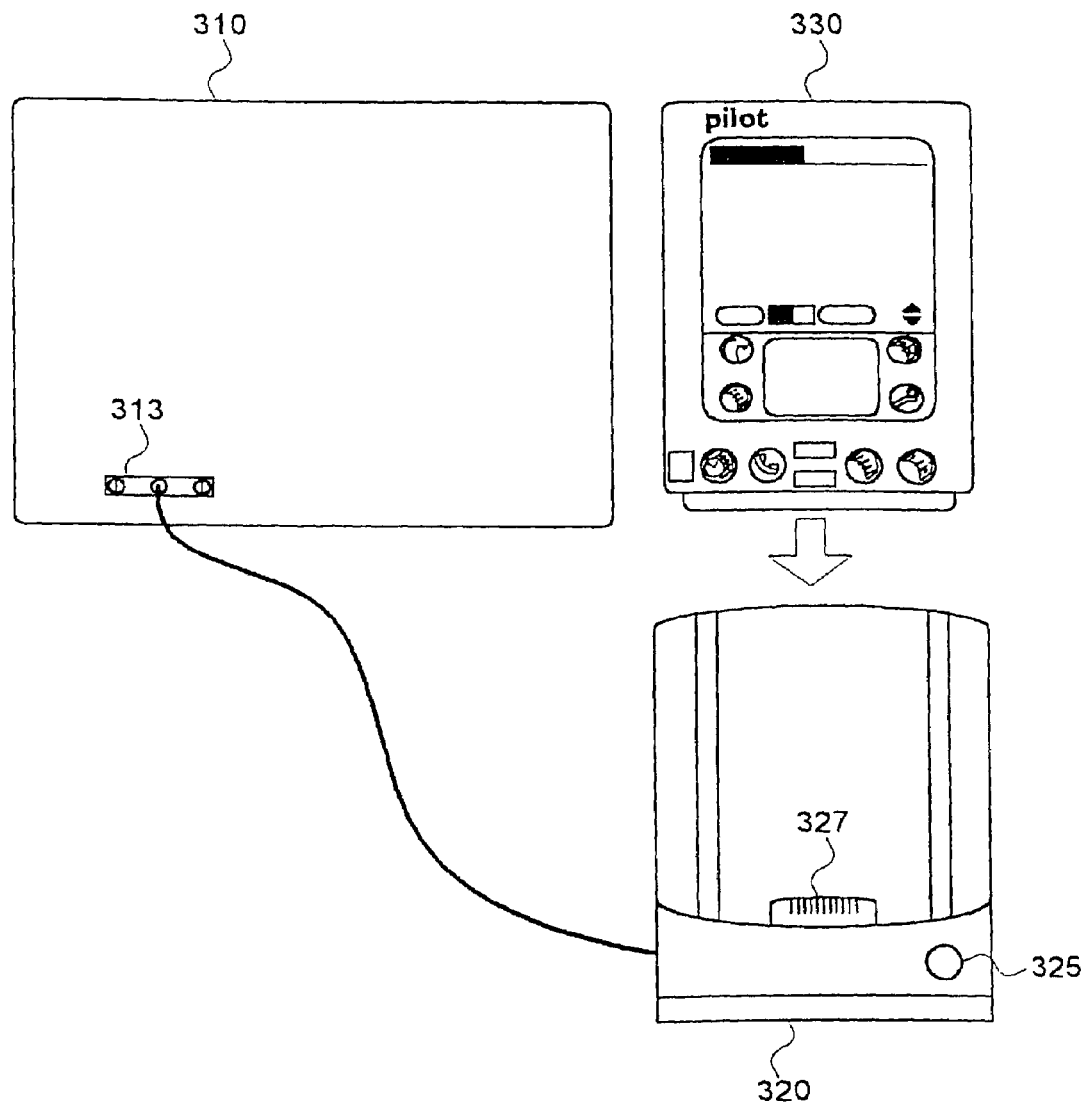
FIG. 3 illustrates a portable computer system and a personal computer system equipped with a cradle for synchronizing with the portable computer system.

FIG. 3 illustrates a portable computer system 330. The portable computer system 330 may execute a number of different application programs. However, the most common applications on the portable computer system 330 will consist of a suite of Personal Information Management (PIM) applications such as the addressbook application, the calendar application, the To-Do list application, and the memo pad application previously described. Most people that use a portable computer system 330, also have a personal computer system that has the same or similar applications. It would therefore be desirable to synchronize information between the portable computer system 330 and the personal computer system. This would allow the user to edit the information while using the desktop personal computer system at an office and edit the same information when using the portable computer system while traveling.

Referring again to FIG. 3, a desktop personal computer system 310 is also illustrated. Coupled to the serial port 313 of the desktop personal computer system 310 is a communication cradle 320. The communication cradle 320 is used to provide a serial communication link between the portable computer system 330 and the personal computer system 310. Specifically, the serial communication lines from the serial port 313 are extended and terminate at a serial interface connector 327 on the communication cradle 320. A matching serial interface connector (not shown) on the rear of the portable computer system 330 connects the portable computer system 330 to the personal computer system 310.

To synchronize the information on the portable computer system 330 with the information on the personal computer system 310, a user drops the portable computer system 330 into the communication cradle 320 and presses a synchronization button 325 on the communication cradle 320. The synchronization button 325 causes a synchronization program on the portable computer system 330 to execute. The synchronization program on the portable computer system 330 wakes up a peer synchronization program on the personal computer system 310. The synchronization program on the portable computer system 330 and the peer synchronization program on the personal computer system 310 perform the necessary operations to synchronize information stored on the two computer systems. The architecture of the synchronization process is described in the U.S. patent application entitled "Extendible Method and Apparatus for Synchronizing Multiple Files On Two Different Computer Systems" with Ser. No. 08/542,055, filed on Oct. 13, 1995.

The synchronization button 325 on the communication cradle 320 operates similar to the application buttons on the personal computer system 310. Specifically, the synchronization button 325 on the communication cradle 320 asserts a hardware interrupt signal to the processor in the personal computer system 310. The interrupt routine determines that the synchronization button 325 was pressed and thus starts executing the synchronization program on the portable computer system 330. Thus, the synchronization button 325 uses an externally accessible version of the application buttons.

Figure 4:
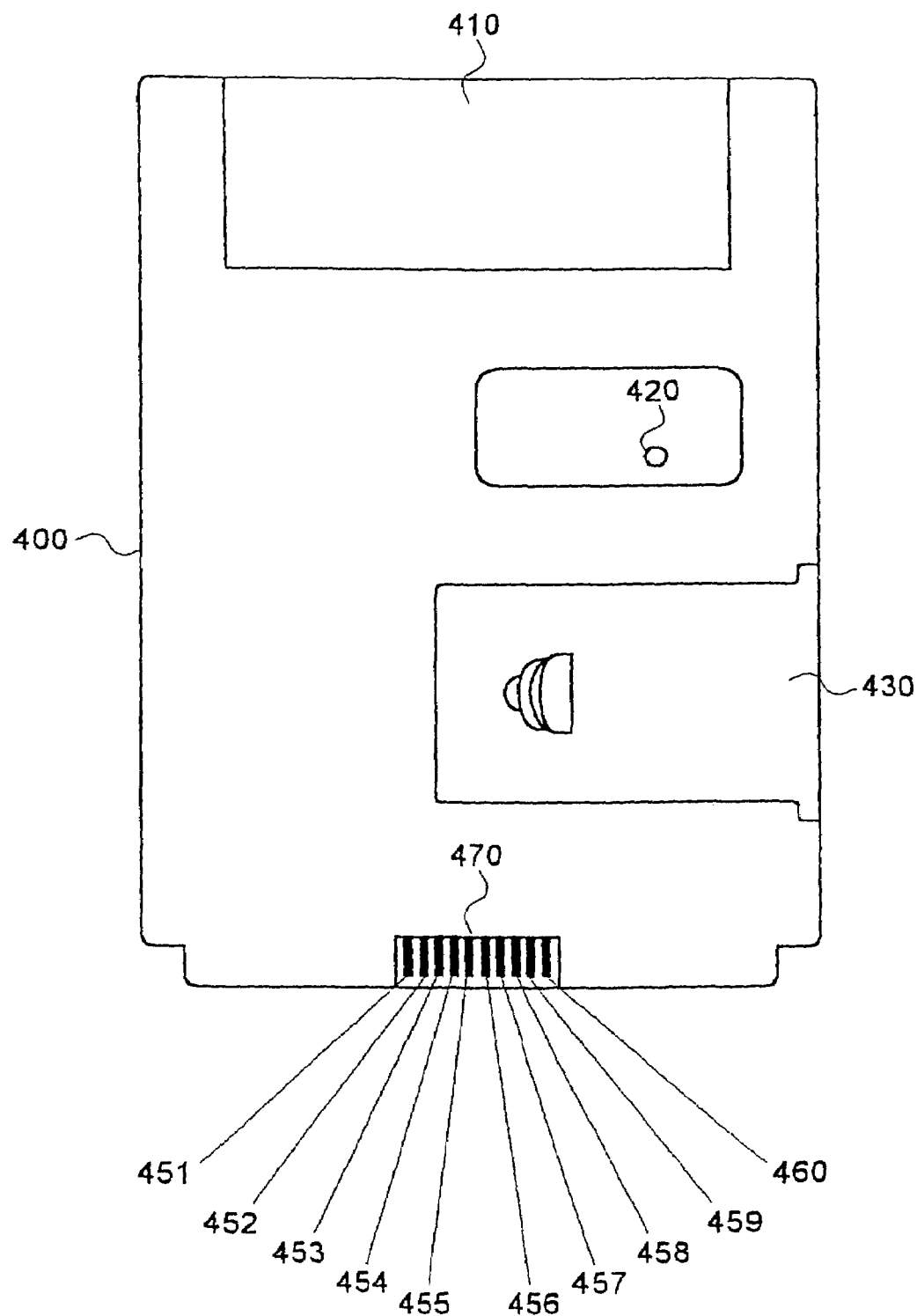
FIG. 4 illustrates the rear of a portable computer system with an interface for communicating with the synchronization cradle of FIG. 3.

FIG. 4 illustrates the rear panel of a portable computer system 400 for use in the communication cradle 320. Referring to the bottom of portable computer system 400, a set of printed circuit board interface connectors 451 though 460 are illustrated. The printed circuit board interface connectors connect with a corresponding interface on the communication cradle 320. The following table lists the printed circuit board interface connectors in one embodiment of the portable computer system 400:

Ref. # Description
451 Data Terminal Ready (DTR) [output]
452 Power output [output]
453 Serial Data Input (RXD) [input]
454 Ready To Send (RTS) [output]
455 Serial Data Output (TXD) [output]
456 Clear To Send (CTS) [input]
457 Hardware Interrupt Line [input]
458 General purpose data input [input]
459 Unused
460 Electrical Ground To assert a hardware interrupt signal to the processor in the portable computer system 400, the synchronization button 325 on the communication cradle 320 only needs to complete an electrical circuit between the power output connector 452 and the hardware interrupt line 457. The hardware interrupt line 457 is different from the hardware interrupt line used by the application buttons. [Is this true?].

Figure 5:
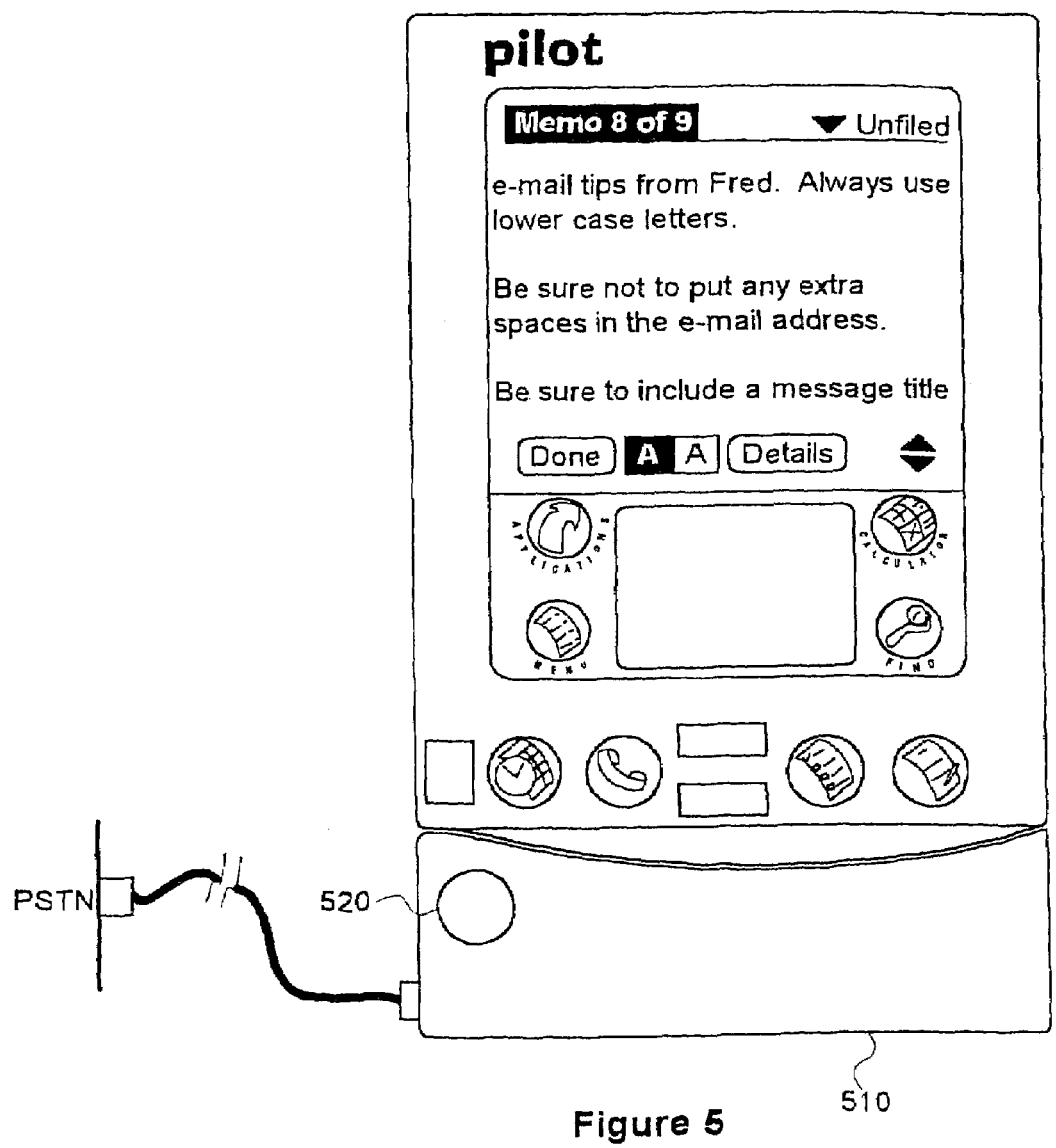
FIG. 5 illustrates a portable computer system equipped with a small modem for remotely synchronizing with a personal computer system.

The hardware interrupt line 457 can be used to perform other operations as well. FIG. 5 illustrates a portable computer system coupled to a clip-on modem 510. The clip-on modem 510 includes a remote synchronization button 520 for remotely synchronizing with a companion personal computer. Since a remote synchronization through the clip-on modem 510 is very different than a local synchronization through a communication cradle 320, the remote synchronization button 520 needs to execute a different synchronization program or execute the same synchronization program with different input parameters.

To handle the remote synchronization, the remote synchronization button 520 can be wired to assert both the hardware interrupt line 457 and the General purpose data input 458. In such an embodiment, the interrupt service routine that handles a hardware interrupt associated with the hardware interrupt line 457 would first check the General purpose data input 458. If the General purpose data input 458 is not asserted, then a standard synchronization through the communication cradle 320 would be performed. However, if the General purpose data input 458 is asserted, then a special synchronization routine for handling remote synchronizations would be performed.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method comprising performing a machine-executed operation involving instructions executable by a handheld electronic device, said handheld electronic device comprising one or more processors, wherein the machine-executed operation is at least one of:
   A) sending the instructions over transmission media;
   B) receiving the instructions over transmission media;
   C) storing the instructions onto a machine-readable storage medium; and
   D) executing the instructions;
   wherein the instructions are instructions which, when executed by the one or more processors, cause the one or more processors to perform the steps of:
   detecting that a first application button of a plurality of mechanical application buttons is pressed while the handheld electronic device is in a low power state;
   wherein the handheld electronic device includes the plurality of mechanical application buttons;
   wherein at least a first application of one or more applications that are executable on the handheld electronic device is associated with the first application button;
   wherein the first application is associated with the first application button prior to the first application button being pressed;
   wherein said pressing the first application button causes the handheld electronic device to switch from the low power state to an operational state;
   in response to detecting that the first application button in the plurality of a mechanical application buttons is pressed while the handheld electronic device is in a low power state:
      identifying the first application associated with the first application button, and
      then automatically executing the first application to display a selected state of the first application, wherein displaying the selected state of the first application includes automatically displaying user-inputted data for the first application.

2. The method of claim 1, wherein displaying the selected state of the first application includes automatically displaying user-inputted data for the first application entered through a previous use of the first application on the handheld electronic device.

3. The method of claim 1, wherein displaying the selected state of the first application includes automatically displaying user-inputted data previously entered through a computer for use with the first application when the first application is executed on the handheld electronic device.

4. The method of claim 3, wherein automatically executing the first application associated with the first application button includes displaying a selected day by executing a calendar application, wherein displaying the selected day includes automatically displaying an appointment list transferred from the computer.

5. The method of claim 3, wherein automatically executing the first application associated with the first application button includes displaying a list of one or more contacts by executing an address book application transferred from the computer.

6. The method of claim 1, wherein automatically executing the first application associated with the first application button includes displaying a selected day by executing a calendar application, wherein displaying the selected day includes automatically displaying an appointment list created by a user.

7. The method of claim 1, wherein automatically executing the first application associated with the first application button includes displaying a list of one or more contacts by executing an address book application.

8. The method of claim 1, further comprising:
   receiving a signal corresponding to a second application button in the plurality of mechanical application buttons being pressed while the handheld electronic device is in the operational state;
   stopping execution of the first application;
   identifying a second application associated with the second application button, wherein the second application is associated with the second application button prior to the second application button being pressed; and
   automatically executing the second application by displaying a selected state of the second application, wherein displaying the selected state of the second application includes automatically displaying user-inputted data for the second application.

9. The method of claim 8, wherein displaying the selected state of the second application includes automatically displaying user-inputted data for the second application entered through a previous use of the second application on the handheld electronic device.

10. The method of claim 8, wherein displaying the selected state of the second application includes automatically displaying user-inputted data previously entered through a computer for use with the second application when the second application is executed on the handheld electronic device.

11. The method of claim 1, wherein the handheld electronic device switches from the low power state to the operational state by waking said one or more processors of the handheld electronic device.

12. The method of claim 1, wherein the steps further include:
   receiving from a computer data associated with the one or more applications that are executable on the handheld electronic device; and
   wherein receiving from a computer data associated with the one or more applications includes synchronizing the handheld electronic device with the computer.

* * * * *